United States Patent Office 3,496,002
Patented Feb. 17, 1970

3,496,002
PROCESS FOR COATING METAL WITH AROMATIC POLYAMIDES
Wolfgang Wolfes, Witten-Bommern, and Gustav Renckhoff, Witten (Ruhr), Germany, assignors to Chemische Werke Witten GmbH, Witten (Ruhr), Germany
No Drawing. Filed Apr. 22, 1966, Ser. No. 544,384
Claims priority, application Germany, Apr. 24, 1965, C 35,684
Int. Cl. B44d 1/095, 1/097
U.S. Cl. 117—21      8 Claims

ABSTRACT OF THE DISCLOSURE

Metal parts may be melt-coated by vortex sintering, electrostatic coating or flame spraying, etc., with an aromatic polyamide produced by the transesterification of a diaryl ester of isophthalic or terephthalic acid with an aliphatic diamine, wherein the condensation of the polyamide has been carried out without the addition of chain-terminating agents and at temperatures of from about 100° to 170° C. to give a molecular weight which corresponds to a specific viscosity number of from 0.5 to 1.0. The condensation is preferably carried out in an inert solvent. The armotic polyamide powder is applied to a metal base preheated to a temperature of from about 350° to 430° C. Polyamide coatings, prepared in accordance with the present invention, are smooth and have extremely good mechanical strength and resistance.

---

This invention relates to the melt-coating of metals. More particularly, it relates to the melt-coating of metals with polyamides. Even more particularly, the present invention relates to a process for the melt-coating of metals with aromatic polyamides prepared in a certain way and to the melt-coated parts made thereby.

Various processes are known in the prior art whereby metals may be coated with synthetic materials, for example, by melting solvent-free thermoplastic polymers in powdered form onto the heated metal parts. Such conventional processes include vortex sintering (fluidized dipping), electrostatic coating (for example, the process designated by the trade name "Samesieren") and flame spraying and are generally described in, for example, Rubber and Plastics Age, 1054–55, September 1964.

A temporary low-viscous melt of the thermoplast on the metal is necessary in order to produce a smooth coating free from pores. Apart from other thermoplasts, polyamides are very well suited for coating metals in accordance with the aforementioned processes, if the water absorption thereof is low at 20° C. (room temperature). The types of polyamides employed for metal coating must not have molecular weights that are too high since in that case the melting viscosities thereof are too high and a wrinkled surface—an orange peel effect—is thus produced. For this reason, polyamides having specific viscosity numbers of 1.0 to 1.3 are generally used in such processes. Also, according to the heretofore known customary condensation processes, it is difficult to obtain polyamides with a particle diameter of less than 0.3 mm., which is necessary for the above-mentioned coating processes, since it is very difficult to grind the polyamides and, even so, the final shape of the obtained particles deviates considerably from an ideal ball shape. Although the mechanical resistance of such prior art polyamide layers is adequate for many fields of application, it is nevertheless very frequently desired or necessary that the surfaces be still harder, more resistant to abrasion and generally more resistant to mechanical stresses.

Argentine Patent 142,945 of Feb. 11, 1965 (German application C 31,683), which corresponds to U.S. application Ser. No. 418,883 (now U.S. Patent 3,379,695), describes a process for preparing polyamides from isophthalic and/or terephthalic acid and aliphatic diamines in finely granulated form by initially condensing the diphenyl esters of these acids with the said diamines in an inert solvent at temperatures of from 20° to 150° C. They may subsequently be recondensed at higher temperatures which are close to the melting range of the polyamide being produced, the recondensation temperature generally ranging from about 170° to 350° C. The degree of polycondensation may be influenced or controlled by varying the condensation temperature and condensation time. Furthermore, the molecular weight thereof can be kept low, as is customary, by adding chain-terminating agents thereto.

The polyamides of aromatic dicarboxylic acids prepared according to the above-described processes are obtained in a particle size that is suitable for the melt-coating processes mentioned hereinabove. The physical properties measured on extruded parts of such polyamides demonstrate that these polyamide powders are extremely well suited as protective layers on metals. The difficulty of coating metals with polyamides of aromatic dicarboxylic acids resides in the fact that they do not have a sharply defined melting point and, at specific viscosity numbers of from 1.0 to 1.3, already have very high melting viscosities. As a result, parts to be coated therewith in a melt-coating process have to be heated to a very high temperature in order to assure a good smooth coating of the polyamide on the treated surface. The required temperatures therefor are about 450° to 480° C. Thus, the danger of the occurrence of thermal decomposition in such a case becomes very great.

One of the objects of the present invention is to provide an improved process for the preparation of polyamide-coated metals which overcomes the disadvantages and deficiencies of the prior art methods.

Another object of the present invention is to provide metals coated with polyamides having a smooth and pore-free surface.

A further object of the invention is to provides polyamide-coated metals and a process for preparing the same which may be carried out in an efficacious manner.

A still further object of the invention is to provide metals coated with polyamides having a high quality smooth surface which may be obtained with the use of the known vortex sintering, electrostatic coating and flame-spraying processes.

These and other objects and advantages of the present invention will become apparent to those skilled in the art from a consideration of the following specification and claims.

In accordance with the present invention, it has been found that excellently smooth coatings having extremely good mechanical strength or resistance are obtained in the melt-coating of metal parts according to the known processes of vortex sintering, electrostatic coating (Samesieren") or flame-spraying if polyamide powders, produced by the transesterification of the diaryl esters of isophthalic and terephthalic acid with aliphatic diamines, are employed wherein the condensation thereof has been carried out without the addition of chain-terminating agents at temperatures of from 100° to 170° C. to give a molecular weight which corresponds to a specific viscosity number of from 0.5 to 1.0. The condensation is preferably carried out in an inert solvent.

It is surprising that impact-resistant and tough coatings are obtained with a polyamide which has a viscosity number of less than 0.8 wherein the polyamide is in contact with the metal to be coated for only a short period of time, whereby melt-coating thereof takes place.

Although the immersion period, for example, during the vortex sintering of a metal part which has been preheated to 400° C. lasts only from 1 to 1.5 seconds and the period of flow of the molten polyamide only approximately 10 to 30 seconds, the viscosity number of such a detached polyamide layer is approximately 1.0 above that of the starting material. Under identical conditions, a corresponding polyamide which has been melt-condensed from the salt of the same acid with the diamine and subsequently ground gives a film which disintegrates because of thermal stress during the melt-coating process.

The temperatures to which the metal parts are heated when the aromatic polyamides described in accordance with the present invention are employed range from 350° to 430° C. This temperature range is used customarily when aliphatic polyamides are utilized.

During the "Samesieren" electrostatic coating process, it is advantageous to heat up the part to be coated prior to the coating thereof, as is done in the vortex sintering process, since the electrostatic adhesion at room temperature allows only for the application of a thin layer.

As stated hereinabove, the particular aromatic polyamides described herein may be used to coat metals by the known vortex sintering, electrostatic coating or flame-spraying processes whereby smooth coatings of high quality are obtained.

The following examples are given merely as illustrative of the present invention and are not to be considered as limiting.

EXAMPLE I

According to the condensation process described in Argentine Patent 142,945, a polyamide of 70 mole percent diphenyl isophthalate, 30 mole percent diphenyl terephthalate, and an equimolecular amount of hexamethylenediamine is condensed at 140° C. in boiling xylene up to a molecular weight which corresponds to a specific viscosity number of 0.77. A glass frit is filled with the resultant dry polyamide powder and a moderate stream of air is passed therethrough from below so that the polyamide powder then behaves similarly to a fluid. An untreated sheet of iron which had been preheated to 380° C. for 4 minutes is immersed for a short period of time into this vortex bed, removed therefrom, allowed to cool in the air for about 20 seconds and then chilled in a water bath. The polyamide layer is thereafter partly detached or loosened with a knife. In the case of conventionally pretreated sheet irons or those made from VA (stainless) steel, the coating cannot be taken off. The surface of the coating is mechanically cleaned to remove a few adhering iron oxide particles therefrom, and the viscosity number, measured in a phenol-tetrachloroethane mixture, of this polyamide layer is found to be 1.62. The coating is smooth and free from bubbles and pores.

EXAMPLE II

In a manner similar to Example I, a sheet of iron, having been preheated to 380° C., is immersed in the aromatic polyamide and then allowed to cool in the air. The coating is equally smooth and free from bubbles; the surface has a slight gloss. The viscosity number of this coating is 1.74.

EXAMPLE III

In a manner analogous to that described in Example I, an iron sheet, having been preheated to 440° C., is immersed in the polyamide and allowed to cool in the air. The coating is smooth except for a few isolated, very small bubbles which are visible therein. The specific viscosity of the coating is 2.2.

EXAMPLE IV

A polyamide powder similar to that of Example I except that it has a viscosity number of 0.96 is prepared as described in Example I by condensing for three hours in diethylbenzene at 150° C. A vortex bed is produced with this powder, as described in Example I, and an iron sheet preheated to 400° C. is immersed therein and subsequently allowed to cool in the air. A detached sample of the polyamide layer shows a specific viscosity number of 1.78. The surface of the coating appears smooth.

EXAMPLE V

As a comparison, a polyamide powder with a viscosity number of 1.16 is prepared as described in Example I, except that the condensation is carried out, after the addition of chain-terminating agents thereto, for six hours in boiling diethylbenzene at 173° C.

A vortex bed is produced with this powder, as described in Example I, and a sheet of iron is immersed therein at varying temperatures as follows.

Temperature of immersion:       Result
- At 400° C. -- Melting of the polyamide powder on the iron is incomplete.
- At 440° C. -- The resultant coating has a wrinkled surface.
- At 460° C. -- Formation of bubbles, decomposition odor, crater formation.

The layer obtained by immersion at 440° C. has a specific viscosity number of 1.08.

The viscosities indicated hereinabove in the examples are determined by measuring the viscosity of a 1% polymer solution (1 gram of polyamide to 100 cc. of solution) in phenol/tetrachloroethane (60/40) in an Ostwald viscosimeter at a temperature of 25° C. This gives the relative viscosity, $\eta_{rel}$. The reduced specific viscosity (viscosity number) indicated in the examples is calculated from the formula, $\eta_{sp} = \eta_{rel}/c - 1$, where $c$ is the concentration of the tested solution.

The diaryl esters of isophthalic or terephthalic acid to be employed in the present invention are preferably the diphenyl esters thereof or the corresponding esters of isophthalic or terephthalic acid substituted by one or several lower alkyl groups or by one or two halogen atoms in the aromatic nucleus of the acid. However, it is also possible to use the esters of these acids prepared from lower alkyl-substituted phenols. The term "lower alkyl" is meant to refer to alkyl groups containing from 1 to 4 carbon atoms, such as methyl, ethyl, n-propyl, isopropyl, n-butyl, isobutyl, sec-butyl and tert-butyl. Consequently, there may be one alkyl group attached to the aromatic ring of the acid such as methyl, ethyl, propyl or butyl or there may be more than one alkyl group attached thereto, such as the dimethyl, trimethyl, tetramethyl diethyl, tetraethyl, tributyl, etc. derivatives. Halogen- substituted derivatives include those substituted by chloro, bromo and fluoro in the aromatic ring. One or two halogens, the same or different, may be contained in the ring, such as dichloro, dibromo, difluoro, chlorofluoro, chlorobromo, monochloro, monobromo, etc. derivatives.

Thus, besides phenol, examples of alkyl-substituted phenols which may be used to form the ester moiety of the compound to be reacted with the diamine include the isomeric cresols, xylenols, tert-butylphenols, etc. Moreover, in addition to iso- and terephthalic acid, compounds such as methylterephthalic acid, methylisophthalic caid, tert-butylisophthalic acid, chloroisophthalic acids, dichloroterephthalic acid, etc. may be used as the acid component in forming the diesters. The diesters can be prepared according to conventional procedures. When using non-substituted diaryl esters together with diaryl esters having nuclear substitutents in preparing the polyamides, the quantitative ratio thereof may be varied as desired within a wide range.

Any of the primary aliphatic diamines customarily used for the preparation of polyamides may be used as the diamine component in the process of the present invention, as long as there are no other reactive groups on the molecule. These include, for example, tetramethylenediamine, hexamethylenediamine, trimethylhexamethylenediamine, decamethylenediamine, and the like.

When using mixtures of diphenyl isophthalate and diphenyl terephthalate with hexamethylenediamine, a ratio of 60 to 80 mole percent of diphenyl isophthalate and 40 to 20 mole percent of diphenyl terephthalate is preferred.

The diester component and the diamine component are preferably reacted in approximately equivalent amounts. By equivalent amounts it is meant that the number of ester groups to be reacted is approximately equal to the number of amino groups to be reacted.

Benezene and lower alkyl-substituted benzenes such as the diethyl benzenes (xylenes) are particularly suitable as the inert solvent for the reaction of the diester with the diamine, but other inert aromatic hydrocarbons, such as toluene, tetralin, biphenyl, and the like may also be employed. The chain-terminators customarily used in the prior art for the preparation of polyamides, but which are not used in preparing the polyamides employed in the present invention, include monofunctional reactive compounds such as phenyl benzoates, phenyl acetates, monoisocyanates, the acid chlorides of monocarboxylic acids and the like.

The polyamides employed in the present invention are prepared in accordance with the aforementioned application Ser. No. 418,883, now U.S. Patent 3,379,695.

Besides iron, the metals to be coated in accordance with the present invention include any of those customarily employed in the aforementioned prior art processes. Such polyamide-coated metals are utilized in applications wherever it is necessary and desirable to protect the metal against corrosion and where a simple lacquering treatment therefor is not sufficient, fo rexample, with lawn furniture, valves, flanges, mounting parts, fence posts, electric motor parts, supporting handles, shelf supports, etc.

The invention being thus described, it will be obvious that the same may be varied in many ways. Such variations are not to be regarded as a departure from the spirit and scope of the invention and all such modifications as would be obvious to one skilled in the art are intended to be included herein.

We claim:

1. In a process for the prepartion of polyamide-coated metals by melt-coating the metals with a polyamide powder by bringing said polyamide into contact with the heated metal, the improvement which comprises employing as the polyamide therefor an aromatic polyamide prepared by transesterifying a diaryl ester selected from the group consisting of the diaryl esters of isophthalic and terephthalic acid, the lower alkyl and halogen-substituted derivatives thereof and mixtures thereof with a primary aliphatic diamine in the absence of a chain-terminating agent at a temperature of from about 100° to 170° C. until a molecular weight corresponding to a specific viscosity of from 0.5 to 1.0 has been obtained, said metal being heated to a temperature of from about 350° to 430° C.

2. The process of claim 1, wherein said metal is iron.

3. The process of claim 1, wherein said transesterification is carried out in an inert aromatic hydrocarbon solvent.

4. The process of claim 1, wherein said diaryl ester is diphenyl terephthalate.

5. The process of claim 1, wherein said diaryl ester is diphenyl terephthalate.

6. The process of claim 1, wherein said diaryl ester is selected from the group consisting of diphenyl isophthalate and diphenyl terephthalate and said primary aliphatic diamine is hexamethylenediamine.

7. In a process for the preparation of polyamide-coated metals by melt-coating the metals with a polyamide powder by bringing said polyamide into contact with the heated metal, the improvement wihch comprises employing as the polyamide therefor an aromatic polyamide prepared by transesterifying diphenyl isophthalate or diphenyl terephthalate with hexamethylenediamine in an inert aromatic hydrocarbon solvent in the absence of a chain-terminating agent at a temperature of from about 100° to 170° C. until a molecular weight corresponding to a specific viscosity of from 0.5 to 1.0 has been obtained, said metal being pre-heated to a temperature of from about 350° to 430° C.

8. The process of claim 7, wherein said metal is iron.

References Cited

UNITED STATES PATENTS

| 2,731,432 | 1/1956 | Toulmin. | |
| 2,844,489 | 7/1958 | Gemmer | 117—21 |
| 2,952,561 | 9/1960 | Young et al. | |
| 2,972,553 | 2/1961 | Hess. | |
| 3,004,861 | 10/1961 | Davis | 117—21 |
| 3,380,969 | 6/1963 | Hill et al. | |
| 3,379,695 | 4/1968 | Wolfes et al. | 260—78 |

WILLIAM D. MARTIN, Primary Examiner

RAYMOND M. SPEER, Assistant Examiner

U.S. Cl. X.R.

117—161